United States Patent [19]

Hudson et al.

[11] 4,289,274
[45] Sep. 15, 1981

[54] RAIL TRACK

[75] Inventors: Richard C. Hudson; Andrew W. Howarth, both of Barnsley, England

[73] Assignee: Gyro Mining Transport Limited, Barnsley, England

[21] Appl. No.: 8,706

[22] Filed: Feb. 1, 1979

[30] Foreign Application Priority Data

Sep. 6, 1978 [GB] United Kingdom ............... 35736/78

[51] Int. Cl.$^3$ ............................................. E01B 11/38
[52] U.S. Cl. .................................. 238/249; 238/251; 238/253; 403/318; 403/328
[58] Field of Search ............... 238/151, 243, 244, 249, 238/251, 253, 260, 261, 262; 403/154, 155, 316, 318, 328

[56] References Cited

U.S. PATENT DOCUMENTS

| 753,024 | 2/1904 | White | 403/154 |
|---|---|---|---|
| 978,314 | 12/1910 | Leonard | 238/249 |
| 1,098,909 | 6/1914 | Klimeczek et al. | 238/251 |
| 1,391,092 | 9/1921 | Beach | 403/328 X |
| 1,496,349 | 6/1924 | McClees | 238/249 |
| 2,691,146 | 10/1954 | Pollock | 403/328 X |
| 2,851,295 | 9/1958 | Chaffee | 403/328 |
| 3,698,748 | 10/1972 | Petri | 403/328 |

FOREIGN PATENT DOCUMENTS 1500537  2/1978  United Kingdom .

Primary Examiner—Randolph A. Reese
Attorney, Agent, or Firm—Trexler, Wolters, Bushnell & Fosse, Ltd.

[57] ABSTRACT

A rail length and rail joint is described which avoids the use of bolts, the rail length comprising basically a fastening element secured at each rail end to be joined, the element being provided with a through bore extending parallel to the longitudinal axis of the associated rail length and a projection located in a position in which it intersects the bore and being radially displaceable to a location in which it lies clear of the bore. The rail length may be provided at each end with such a fastening element, one constituting a male element and the other a female element, the rail joint incorporating abutting male and female elements and a necked connecting pin.

13 Claims, 4 Drawing Figures

RAIL TRACK

This invention relates to rail tracks and in particular to rail lengths and to joints for adjacent ends of adjacent rail lengths. The track may be in the form of two spaced apart rails e.g. of conventional cross-section comprising a rail head spaced by a web from a rail foot, or may be in the form of a monorail, of any suitable cross-section.

The well-known rail joint employs fish plates, one secured to each side of the web, with a plurality of bolts passing through co-axial holes in both fish plates and the web. Although the effectiveness of this system has proved itself over many years use, insertion or removal of the bolts during assembly or dismantling of the track, as well as inspection and adjustment of the bolts in service is a laborious operation, especially if the track is located in a difficult operating location, e.g. a mine roadway.

According to a first aspect of the present invention, a rail length to form part of a rail track comprises a fastening element secured at each rail end to be joined, the element being provided with a through bore extending parallel to the longitudinal axis of the associated rail length and a projection located in a position in which it intersects the bore and being radially displaceable to a location in which it lies clear of the bore.

According to a second aspect of the present invention, a rail length as defined above is provided at one end with a male fastening element housing in part a connecting pin, and is provided at its other end with a female fastening element adapted to receive a portion of a connecting pin of an adjacent similar rail length.

According to a third aspect of the present invention, a rail joint comprises two rail lengths as defined above, the through bores of each fastening element being co-axial and a connecting pin of length approximating the overall length of the two abutting fastening elements being inserted into the co-axial bores, the pin having two axially spaced necks one of which in the inserted position is located opposite each projection.

Thus, in use, to assemble the joint as defined above, the pin may simply be hammered into the co-axial bores, thereby obviating any nut and bolt assembly and subsequent tightening in order to join rail lengths together.

Although it is possible to observe when the pin has been satisfactorily inserted, the pin is preferably provided at one end with an enlarged head to dictate the extent of penetration into the bores, while it is also preferred to provide the pin with a pair of axially spaced necks. Preferably, the bores and the pin are of circular cross-section. To ease insertion of the pin, the latter is preferably provided with a frusto-conical nose, while other frusto-conical surfaces may connect inner ends of the necks to the full diameter of the pin, a radially extending shoulder defining the outer end of each neck. The fastening elements are preferably secured by welding to their respective ends of the rail lengths.

Conveniently, each projection may be constituted by a STUDLOCK(Trade Mark) element wherein each projection is constituted by a portion of a steel pin around a central portion of which is bonded a rubber bush retained in a housing having a screw-threaded outer periphery. Thus each fastening element is provided with a tapped hole extending radially to its through bore, into which hole the retainer housing is screwed. Upon inserting the connecting pin, the projections are pushed radially outwardly, against the urge of their respective rubber bushes which automatically advance the projections upon the appearance of the necks opposite the pins. Preferably, one of the fastening elements is provided with a projection having a head engageable by a tool to withdraw the projection from the through bore when it is required to dismantle the joint.

The invention will now be described in greater detail, by way of examples, with reference to the accompanying drawings, in which FIG. 1 shows rail lengths in accordance with first and second aspects of the invention, forming part of a rail track and incorporating rail joints in accordance with a third aspect of the invention;

Figure 1:
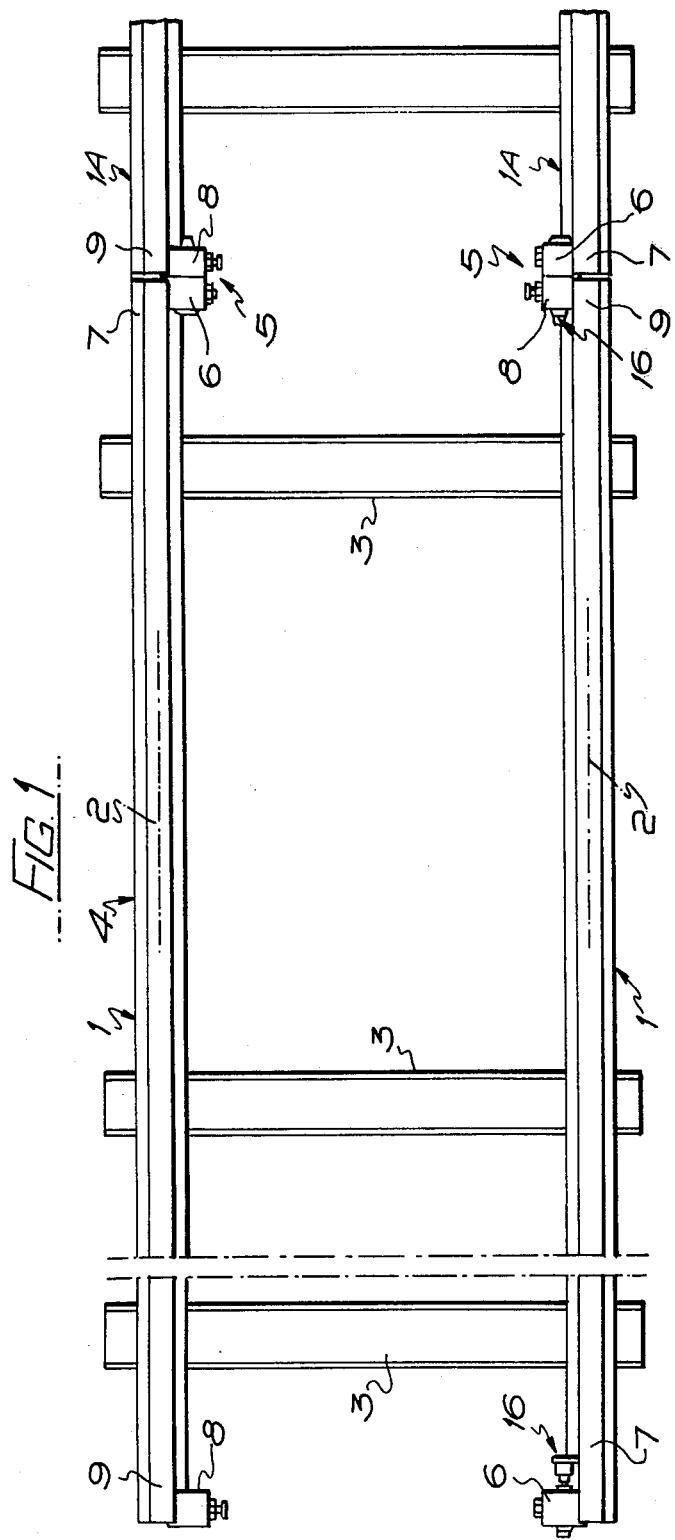

In the drawings, a pair of spaced apart, parallel rail lengths 1 having a longitudinal axis 2 are secured to common sleepers 3 to form a portion of a rail track 4, the rail lengths 1 being secured at rail joints 5 to adjacent ends of adjacent rail lengths 1A, which lengths are identical to the lengths 1.

Figure 2:
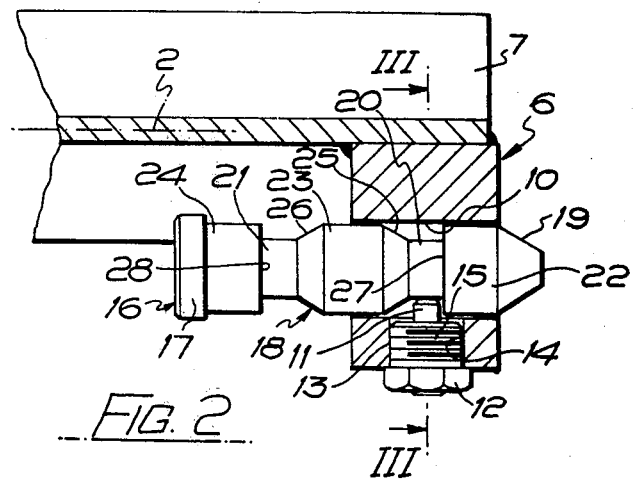
FIG. 2 is an enlarged part-sectional view of one end of a rail length of FIG. 1.
Figure 3:
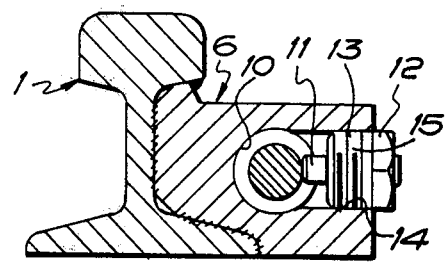
FIG. 3 is a sectional view on the line III—III of FIG. 2.
Figure 4:
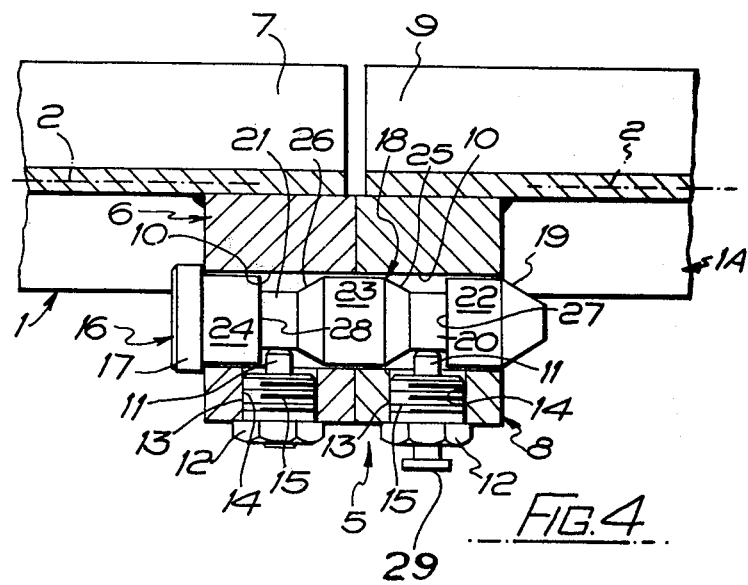
FIG. 4 is a part-sectional view through a rail joint of FIG. 1.

Each rail length 1 comprises a fastening element 6 welded to one rail end 7 and a fastening element 8 welded to the other rail end 9. As best seen in FIGS. 2 to 4, each fastening element 6, 8 is provided with a through bore 10 which extends parallel to the longitudinal axis 2 of each rail length 1. A projection 11 is located in a position in which it intersects the bore 10, but is so mounted with respect to its fastening element 6 that it is radially displaceable from the bore 10. Thus the projection 11 may be constituted by a portion of a steel pin of a STUDLOCK (Trade Mark) element comprising a hexagonal head 12 carrying an externally screw-threaded sleeve 13, which sleeve is screwed into a tapped radial hole 14 in the fastening element 6, a rubber bush 15 being bonded to the inside of the sleeve 13, and also being bonded around a portion of the external periphery of the pin 11, the latter passing co-axially through the bush 15, whereby the resilience of the bush 15 accommodates radially outward displacement of the pin 11.

In accordance with the second aspect of the invention, the rail length 1 has one of its fastening elements 6 constituting a male fastening element, by being provided with a connecting pin 16 having a head 17 and a body portion 18, the latter having a maximum diameter such that it is insertable into a bore 10, while the head 17 is of dimensions such that it cannot enter a bore 10. The pin 16 is furthermore provided with a frusto-conical nose 19 and with spaced apart necks 20 and 21 separating portion 22, 23 and 24, the portion 23 being provided with frusto-conical surfaces 25, 26, leading respectively to each neck 20, 21 while a radially-extending shoulder 27, 28, defines another end respectively of each neck 20, 21. It is arranged for the diameter of each neck 20, 21 to be such that it accommodates the projecting pin 11 with the latter engaged behind a shoulder 27 or 28, when the bush 15 is in a non-compressed condition. Thus the other fastening element 8 constitutes a female fastening element and to enable the rail joint 5 to be readily dismantleable, the pin 11, at its end remote from the bore 10 is provided with a head 29, for engagement with any suitable extraction tool, so that the pin 11 may be retracted from engagement with its associated shoulder 27, whereupon the connecting pin may be retracted from the bore 10 of the female fastening element 8.

In FIG. 4 is illustrated the rail joint 5 effected between adjacent ends of two rail lengths 1, 1A, the joint 5 comprising two fastening elements 6, 8. The fastening elements are butted together as shown in FIG. 4 and the pin head 17 is struck by a hammer to drive the nose 19 into the bore 10 of the female fastening element 8, thereby displacing the projecting pin 11 of that element into its rubber bush 15. Upon appearance of the neck 20 opposite the pin 11 of the female fastening element 8, that pin, under the urge of its bush 15 snaps into engagement behind the shoulder 28, simultaneously the projecting pin 11 of the male fastening element 6 is radially displaced by the action of initially the surface 25 and thereafter the external periphery of the portion 23, this pin thereafter being allowed to re-enter the bore 10 of the male fastening element 6 under the control of the surface 26, until the condition shown in FIG. 4 is reached. In this condition, it will be appreciated that any separating forces on the rail ends 7 are resisted by the two pins 11 of each rail joint 5 engaging an adjacent shoulder 27, 28.

What we claim is:

1. A rail length to form part of a rail track comprising: a fastening element secured at each rail end to be joined, said element being provided with a through bore extending parallel to the longitudinal axis of said associated rail length, one said element providing a male fastening element at one end of said rail length, said male fastening element housing in part a connecting pin having an enlarged head at one end and a pair of axially spaced necks along the length thereof, and the other of said elements providing a female fastening element at the other end of said rail length, said female fastening element including a through bore being adapted to receive a portion of the connecting pin of the male fastening element of an adjacent, similar rail length, and a resiliently mounted projection carried by each said fastening element located in position to intersect each respective bore and to be engaged with an associated neck on said connecting pin, carried by said female fastening element said projection including head means engageable to provide for selective withdrawal of said projection from the bore, thereby radially displacing said projection to a location in which it lies clear of said bore for disengagement from a mating rail length.

2. A rail length as claimed in claim 1, wherein said bores and said pin are of circular section.

3. A rail length as claimed in claim 1, wherein said fastening elements are secured by welding to their respective ends of said rail lengths.

4. A rail length as claimed in claim 1, wherein a frusto-conical nose is provided on said pin.

5. A rail length as claimed in claim 1, wherein frusto-conical surfaces connect inner ends of the necks to the full diameter of the pin, a radially extending shoulder defining the outer end of each neck.

6. A rail length as claimed in claim 1, wherein a portion of a steel pin constitutes each said projection, a rubber bush bonded around a central portion of each said pin, a housing retaining each said bush and a screw-threaded outer periphery provided on said housing, a tapped hole provided in each fastening element, each said hole extending radially with respect to its through bore, into which hole said housing is screwed.

7. A rail joint comprising two rail lengths, each said rail length including a fastening element secured at each rail end to be joined, said fastening element being provided with a through bore extending parallel to the longitudinal axis of said associated rail length, and a resiliently mounted projection carried by each said fastening element and located in a position in which it intersects said bore said through bores of said fastening elements being co-axial and a connecting pin of length approximating to the overall length of two abutting fastening elements being inserted into said co-axial bores, said pin having two axially spaced necks, one of which in the inserted position is located opposite each said projection, each said projection including head means engageable to provide for selective withdrawal of said projection from the bore, thereby radially displacing said projection to a location in which it lies clear of said bore for disengagement.

8. A rail joint as defined in claim 7, wherein said pin is provided at one end with an enlarged head.

9. A rail joint as claimed in claim 7, wherein said bores and said pin are of circular section.

10. A rail joint as claimed in claim 7, wherein said pin is provided with a frusto-conical nose.

11. A rail joint as claimed in claim 7, wherein frusto-conical surfaces connect inner ends of said necks to the full diameter of said pin, a radially extending shoulder defining the outer end of each neck.

12. A coupling construction for joining a pair of rails together in end-to-end relation comprising: fastening elements adapted to be affixed to the rail ends to be joined, a first one of said fastening elements having a longitudinal bore spaced from and extending along side of the associated rail to be joined, and including first projecting means extending into said longitudinal bore; the other of said fastening elements including a longitudinal bore and resiliently mounted second projecting means extending into said bore, elongate connecting means arranged to enter said longitudinal bore of said other fastening element, and including first detent means for receiving said second projecting means carried by said other fastening element, said elongate connecting means being provided by a pin-like member disposed in said bore of said other fastening element and extending therefrom for disposition in the bore provided by said first fastening element, and including second detent means for receiving the first projecting means provided by said first fastening element to lock said pin-like member in position in said bores, said first projecting means being resiliently mounted and including head means engageable to provide for selective withdrawal of said first projecting means from the bore to disengage said first projecting means from said detent means.

13. A coupling arrangement according to claim 12 wherein each said projecting means is provided by a steel pin, carried within a housing engaged in a hole provided in the associated fastening element and extending radially of the longitudinal bore, a rubber bushing bonded about each said pin with said housing retaining said bushing while the resilient nature thereof permits said steel pin to move resiliently.

* * * * *

UNITED STATES PATENT AND TRADEMARK OFFICE
CERTIFICATE OF CORRECTION

PATENT NO. : 4,289,274
DATED : September 15, 1981
INVENTOR(S) : Richard C. Hudson and Andrew W. Howarth It is certified that error appears in the above-identified patent and that said Letters Patent are hereby corrected as shown below:

Column 3, lines 43 and 44 should read "neck on said connecting pin, said projection carried by said female fastening element including head means"

Column 3, line 61, cancel "each"

Signed and Sealed this

Nineteenth Day of January 1982

[SEAL]

Attest:

*Attesting Officer*

GERALD J. MOSSINGHOFF

*Commissioner of Patents and Trademarks*